Feb. 17, 1925.

M. VAN OMMÉ

1,526,886

CORN HARVESTING MACHINE

Filed July 23, 1923     4 Sheets-Sheet 1

Witness
Lynn Latta

Inventor
Martiennes Van Ommé
By Bair & Freeman
Att'ys

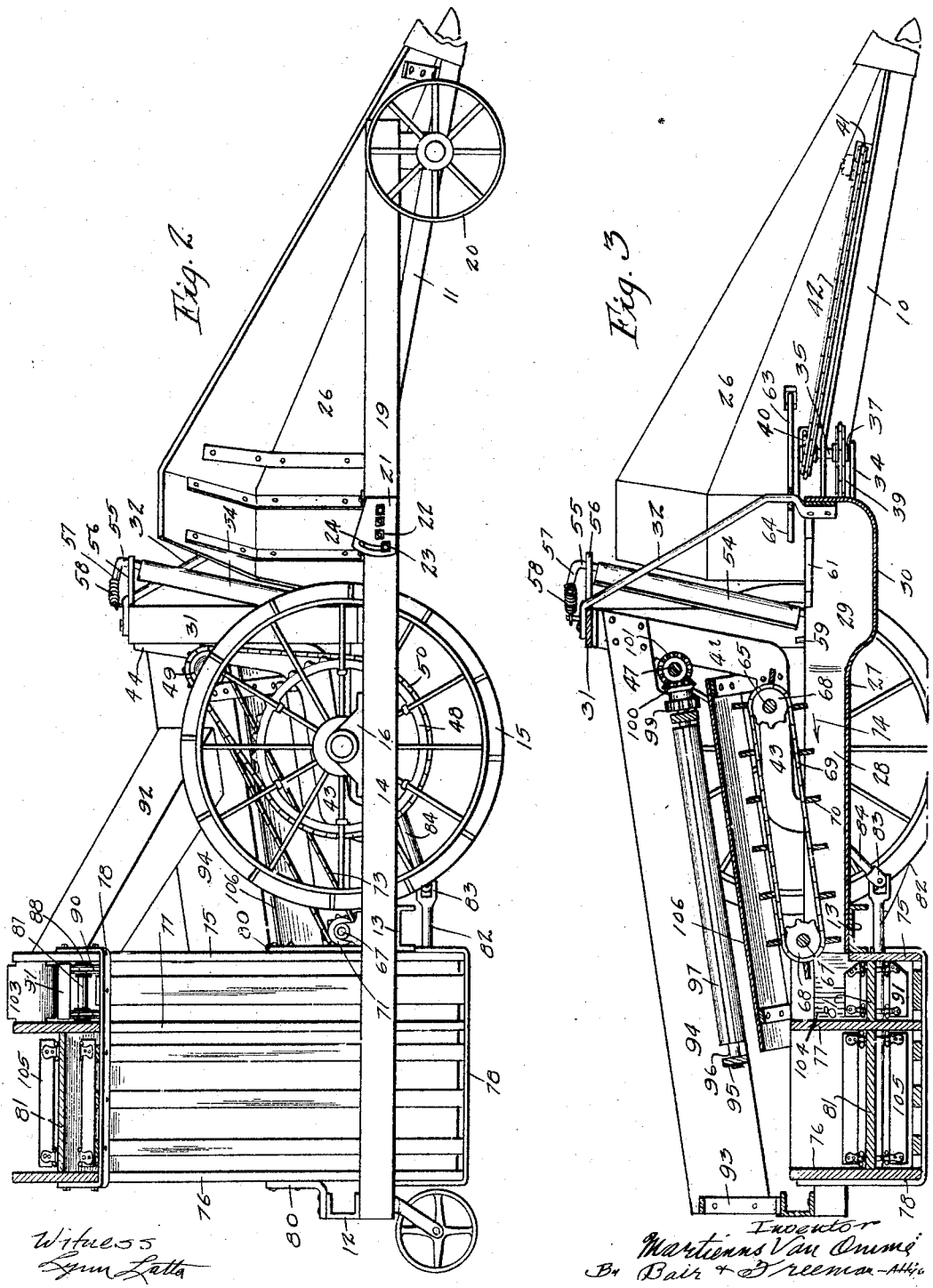

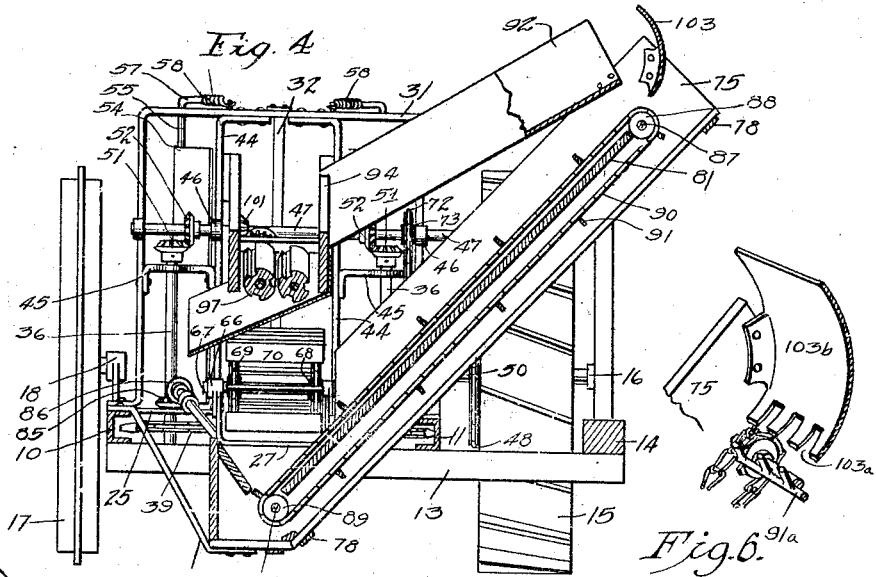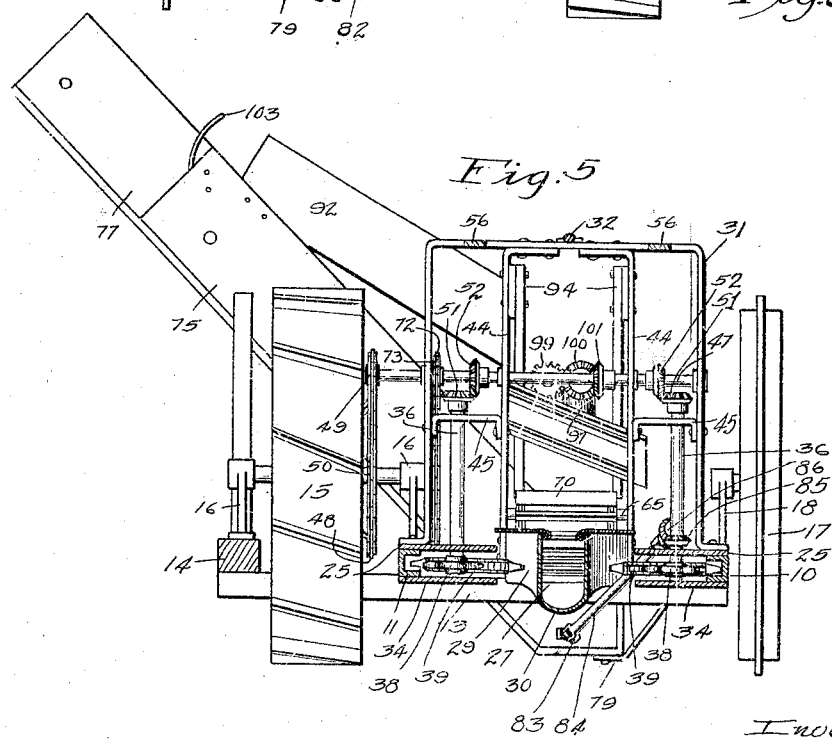

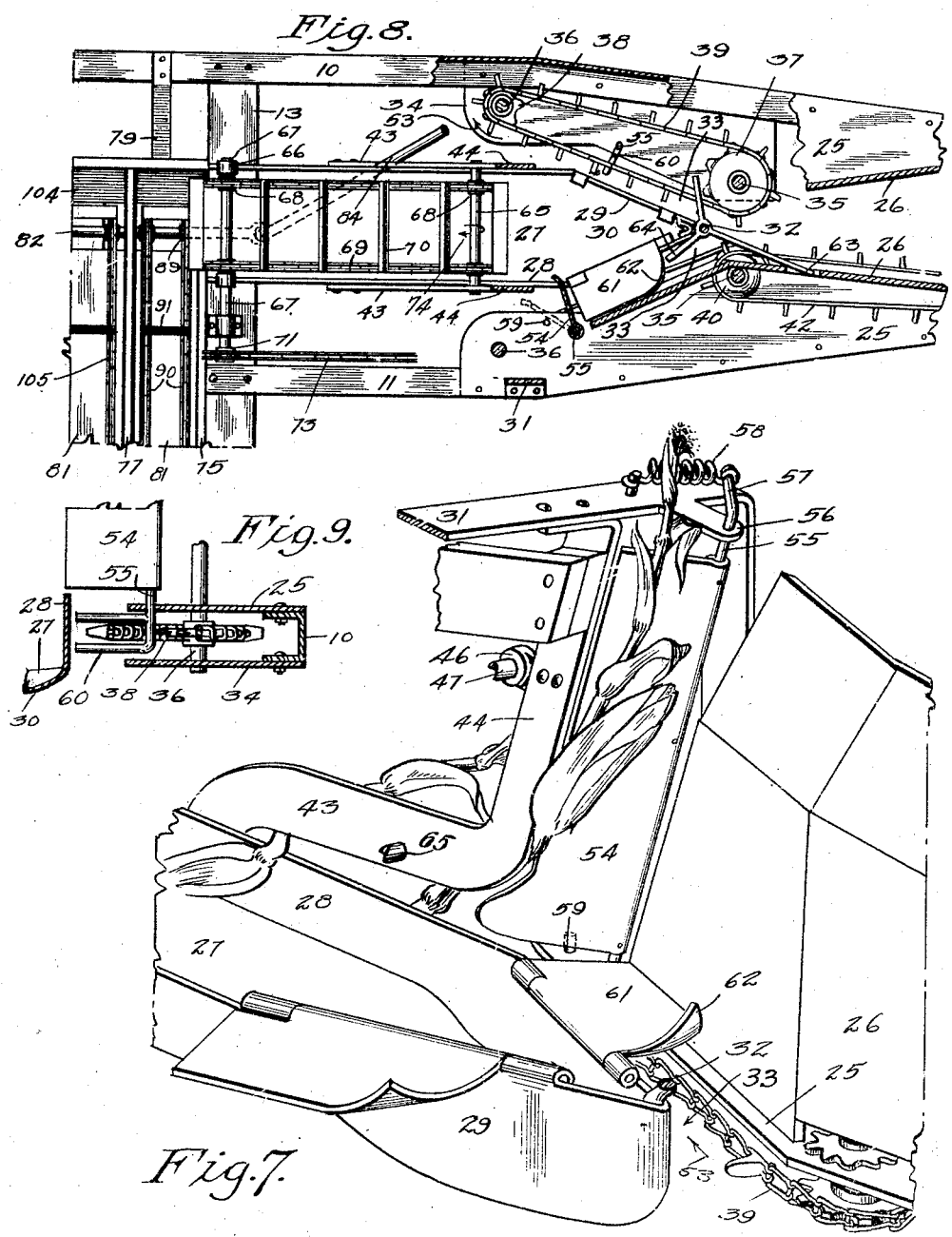

Patented Feb. 17, 1925.

1,526,886

UNITED STATES PATENT OFFICE.

MARTIENNS VAN OMMÉ, OF DES MOINES, IOWA.

CORN-HARVESTING MACHINE.

Application filed July 23, 1923. Serial No. 653,177.

*To all whom it may concern:*

Be it known that I, MARTIENNS VAN OMMÉ, a subject of the Queen of Holland, and a resident of Des Moines, in the county of Polk and State of Iowa, United States of America, have invented a certain new and useful Corn-Harvesting Machine, of which the following is a specification.

An object of my invention is to provide a corn harvesting machine of simple, durable and inexpensive construction, which can easily be drawn over a field.

In order to attain this object, I designed my machine so that the picking of the corn is done by means of hooks disposed at the sides of a receiving pan into which the corn ears will drop after being snapped from the stalks by the hooks.

A further object is to provide in such a machine, husking mechanism and a pair of elevators, one for elevating the corn to the husking rolls and the other for elevating the husked corn from the husking rolls to a wagon, the elevator frames being formed integral side by side and driven by a common shaft.

A still further object is the arrangement of the parts, so that the driving mechanism which links the tractor wheel with the various driven parts of the machine is of the most simple construction, and the parts of which are easily accessible for repair.

A still further object is to arrange the parts so that the frame for supporting the various elements is of the simplest and cheapest construction.

In explanation of this object, it may be said that the frame is to be composed of two forwardly projecting divider arm frame members, which extend also to the extreme rear of the machine, and which are linked together at their rear ends by two spaced cross members, which extend, at one side of the machine beyond the divider arm frame member at that side of the machine, so as to receive the tongue or draw bar member, between which and the adjacent divider arm frame member, the tractor wheel is supported, the elevators being supported between the two rear cross members and having their longitudinal axes in line therewith.

A still further object is to provide in connection with the snapping hooks and receiving pan, means for guiding the ear of corn into position where it will be severed from the stalk by the snapping hooks and received by the pan.

A more particular object is to provide means for gripping an ear of corn after it has entered the receiving pan and forcibly carrying it to the rear of the pan for severing it from its stem and for delivering it to the first elevator.

With these and other objects in view, my invention consists in the construction, arrangement and combination of the various parts of my device, whereby the objects contemplated are attained, as hereinafter more fully set forth, pointed out in my claims, and illustrated in the accompanying drawings, in which:

Figure 2 is a side elevation of the same.

Figure 3 is a longitudinal, sectional view through the entire machine taken on the line 3—3 of Figure 1.

Figure 4 is a transverse, sectional view through the first elevator taken on the line 4—4 of Figure 1.

Figure 5 is a transverse, sectional view through the machine looking in the opposite direction from that in which the machine is viewed in Figure 4, taken on the line 5—5 of Figure 1.

Figure 6 is a detail, perspective view of a modified form of a portion of the first elevator.

Figure 7 is a detail, perspective view of a portion of the forward part of the machine, showing the rear part of one of the divider arms, and the mechanism for guiding the ear of corn in position for snapping.

Figure 8 is a plan view in section of the main parts of the machine, illustrating the snapping mechanism and the means for con veying the ears to the rear of the receiving pan, and Figure 9 is a detail, sectional view of the lower end of the gate member shown in Figure 7 for guiding the ear of corn into position for snapping.

Figure 1:
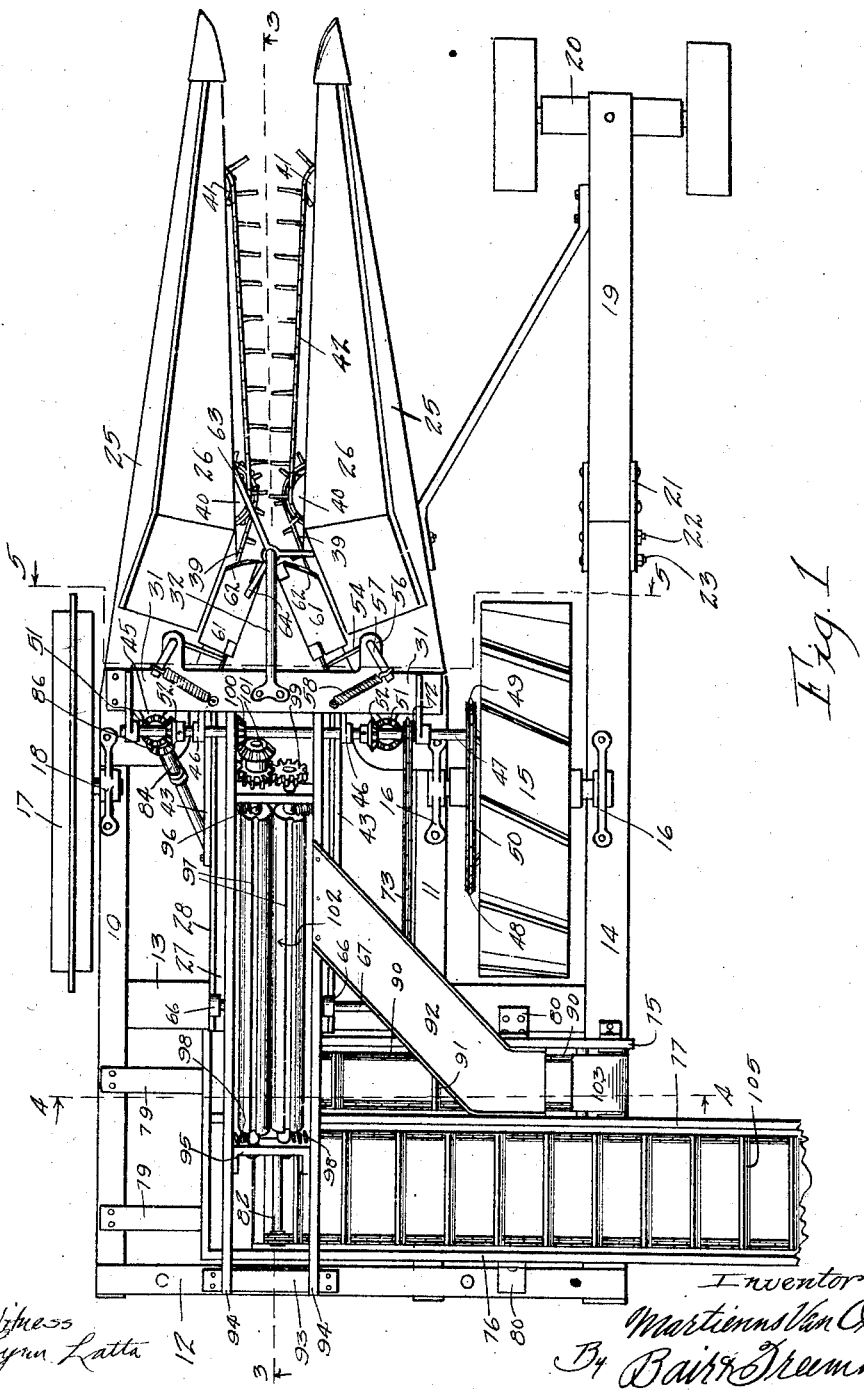
Figure 1 is a plan view of my entire machine, a portion of the second elevator being omitted.

My improved harvesting machine comprises the divider arm frames 10 and 11 which extend forwardly and are bent slightly together as shown in Figures 1 and 8 to receive the various parts of the divider arms.

The frame members 10 and 11 extend to the extreme rear of the machine, where they are connected by a cross frame member 12.

Spaced forwardly from the frame member 12 a substantial distance is the cross frame member 13, which is fixed to the underside of the frame members 10 and 11, so as to be of the proper height to support the receiving pan, which will be hereinafter described.

The members 12 and 13 extend beyond the frame member 11 and are connected at their ends by the tongue 14, which extends forwardly.

Between the tongue 14 and the frame 11 is mounted the traction wheel 15 by means of the brackets 16.

On the other side of the machine is a grain wheel 17 mounted in a bracket 18 fixed to the frame 10.

In order to tilt the machine, the tongue 14 may be comparatively short and have the extension 19 to the forward end of which is fixed the tongue truck 20, the members 14 and 19 being connected by the hinge plates 21 through the middle of which the extension 19 may be slightly raised or lowered with relation to the tongue 14. The hinge plates 21 are rigidly fixed to the extension 19 and hinged to the tongue 14 by a pivot bolt 22. Thus, the machine may be tilted about the traction wheel 15 as a pivot and can be locked at any desired angle of inclination by a clamping bolt 23, which travels in grooves 24 of the hinge plates 21 and locks the tongue 14 relative to the extension 19 by clamping the hinge plates 21 against the sides of the tongue 14.

It will be seen that when the angle between the tongue 14 and the extension 19 is changed, the entire machine will be tilted either forwardly or rearwardly for lowering or raising the divider arms.

The divider arms comprise the base plates 25, which are substantially triangular in shape at their forward ends, as indicated in Figures 1 and 8, and which at their rear ends are slanted outwardly and rearwardly to conform with the contour of the receiving pan, which will later be described.

Fixed to the inner edges of the base plates 25 are the upwardly extending members 26, which form the divider arms proper.

Fixed to the cross member 13 and disposed midway between the divider frames 10 and 11 is the receiving pan 27, having the sides 28, and having its rear end open as shown in Figure 3.

At its forward end, the receiving pan has its sides inclined inwardly and forwardly as at 29, and has its bottom curved downwardly as at 30. (See Figure 3.) The purpose of this downwardly curved portion will later be more fully explained.

Fixed to the plates 25 and the frame members 10 and 11 and disposed somewhat forwardly of the wheels 15 and 17 is the yoke-shaped bridge 31, which serves to connect and brace the frame members 10 and 11 and also to support portions of the machine.

In order to support the receiving pan 27 at its forward end, so that a space will be left on either side through which the stalks of corn may pass, I provide the suspending rod 32, which is fastened at its upper end to the bridge 31.

It will be seen that the pointed nose of the pan is spaced somewhat from the inner edges of the rear portions of the plates 25, so as to leave the passageways 33 through which the corn stalks are guided as they pass through the machine.

In order to aid in the passage of the stalks through the machine, I provide the following described conveying mechanism.

To the underside of the frames 10 and 11 are fixed plates 34, which are identical in their inner outline with the shape of the plates 25, and which extend forwardly to a point somewhat beyond the end of the pan 27.

Between the plates 34 and 25 are mounted the short shafts 35 and the long shafts 36.

On the shafts 35 are sprockets 37 and on the shafts 36 are sprockets 38 over which conveyor chains 39 travel. The shafts 35 extend a little above the plates 25 and at their upper ends receive the sprockets 40.

In the forward end of the divider arms are mounted sprockets 41 and chains 42 connect the sprockets 40 and 41 for conveying the corn stalks within the divider arms.

Fixed to the sides of the receiving pan 27 are the forwardly extending hook members 43, which at their forward ends are curved upwardly and forwardly to form the guide posts 44, which in turn at their upper ends are fixed to the bridge 31. (See Figures 3 and 7.)

Between the posts 44 and the sides of the bridge 31 are fixed the brackets 45, which serve to journal the upper ends of the shafts 36.

In bearings 46 fixed to the uprights posts 44 is journaled a power shaft 47, which serves to transmit power to the various parts of my machine from the traction wheel.

On the traction wheel 15 is a sprocket 48 and aligned therewith on the shaft 47 is a sprocket 49.

The sprockets 48 and 49 are connected by a drive chain 50. On the ends of the shafts 36 are beveled gears 51 and on the shaft 47 are beveled gears 52 in mesh with the gears 51.

The rotation of the traction wheel forwardly will drive the beveled gears 51 in the correct direction for causing the chains 39 and 42 to travel as indicated by the arrow 53.

Before proceeding to describe the mechanism for guiding the ear of corn into the space between the hook 43 and the side 28 of the receiving pan, I will describe briefly the way in which the corn stalk passes through the machine.

In the first place, it is necessary that the corn stalk pass along the side of the pan 27 through the passageway 33 and that the upper portion of the corn stalk pass between the member 44 and the upright side of the bridge 31, while the ear of corn is guided downwardly and over the pan 27, so that its stem will finally pass into the space between the side 28 and the hook 43. (See Fig. 7.)

In order to properly guide the ear downwardly, the guide post 44 is slanted, as has been described.

I have provided means for urging the ear of corn inwardly, so that it will either contact with the edge of the guide post 44 or will be shoved entirely past the post 44, so that its stem only will be in engagement therewith.

As the machine moves forwardly, the stalk will tend to pull the ear of corn rearwardly and the slanting edge of the post 44 will force it downwardly until it has passed the lower curved edge thereof.

In order to prevent the ear of corn passing on the outside of the post 44 and at the same time to allow the stalk of corn to pass between the post 44 and the bridge 31, I provide the gate 54, which is mounted on a rod 55 parallel to the post 44 and pivoted in the plate 25 and a bracket 56 on the bridge 31.

At its upper end, the rod 55 is bent over to form the crank arm 57, which is in turn resiliently connected with the bridge 31 by means of a spring 58. The spring 58 normally holds the gate 54 in the position shown in full lines in Figure 8.

A pin 59 limits the movement of the gate 54 on its axis to the position shown in Figure 7.

At its lower end, the rod 55 has the inwardly extending fork 60, which straddles the chain 39 and extends substantially across the passageway 33.

It may be mentioned at this point that the chains 42 are so timed that their inner portions will move rearwardly at a speed somewhat less than the speed with which the machine moves over the ground.

The effect of this is to slightly retard the motion of the upper portions of the stalks through the machine, so as to bend them slightly forwardly by the time they have reached the passageway 33.

The chains 39 will then carry the stalks in the correct position through the machine.

As the stalks move through the passageway 33, the lower ends of the stalks will engage the forks 60 and move the gate 54 to its rearward position.

When the lower portions of the stalks have slipped beyond the ends of the forks 60, the spring 58 will cause the gate 54 to fly back toward its initial position, and in doing so, it will meet the ear of corn or the stalk of corn, so as to give the ear of corn a slanting blow, which is directed somewhat inwardly and forwardly. If the ear of corn is positioned in front of the stalk of corn, the effect of this blow generally will be to swing it around in one direction or the other, until it has assumed either the position shown in Figure 7, or has been swung entirely across the forward edge of the post 44, so that it is extended directly over the pan 27.

If the ear merely assumes the position shown in Figure 7, the forward progress of the machine will bring the butt of the ear against the edge of the post 44 where it will be caught between the gate 54 and the post.

The gate 54 will prevent the ear of corn slipping by on the wrong side of the post 44.

The rearward pull of the stalk caused by the forward motion of the machine will then pull the ear downwardly along the edge of the post 44, whence it will be finally guided within the space between the hook 43 and the edge of the pan 27.

It must be remembered that the ear of corn may assume various positions during this operation, but that the parts are so arranged that the ear of corn will never find room to slide between the post 44 and the gate 54, so that it must ultimately be received in the pan 27.

At times, the ear of corn might be extended directly downwardly from the stalk, and when in such position, it might be possible for the ear of corn to become wedged between the lower end of the post 44 and the bottom of the pan 27. In order to prevent this, I provide the downwardly curved portion 30 heretofore described.

In order to prevent any ear of corn from being thrown down between the forward nose of the pan 27 and the divider arm, I provide a hinged plate 61. The forward edge of the plate 61 is curved forwardly as at 62, and the stalk of corn will engage this curved portion to lift the plate 61 in order to allow the stalk to pass by.

After the stalk has passed beyond the plate 61, the plate 61 will drop back into position for closing the lower passageway 33 and aiding the guidance of the ear of corn within the pan 27.

It will be noted that I have provided duplicate sets of snapping mechanism on either side of the pan 27. This is necessary in most cases, because the stalks of corn are planted so closely together that the stalks from one hill will interfere with the stalks from the next hill, and will not be properly guided through the machine.

I have therefore provided a separating arm 63, which is pivoted at its rear end on the suspending rod 32 and which has the rearwardly and outwardly extending levers 64, which extend across the passageways 33 and will be alternately engaged by the stalks of corn passing through the machine for swinging the separating arm 63 alternately from one side to the other.

It is thought that the operation of the separating arm will be thoroughly understood by an examination of Figure 8 of the drawings.

The separating arm 63 guides the stalk of corn into one or the other of the passageways 33 and the lever 64 extending across that passageway serves to move the separating arm to position for guiding the next stalk of corn into the other passageway.

Journaled in the hook members 43 is a shaft 65. Journaled in bearings 66 at the rear end of the pan 27 is a shaft 67. (See Figure 8.) On the shafts 65 and 67 are the sprockets 68 over which travel the chains 69. Supported by the chains 69 are the slats 70.

The shaft 67 extends considerably beyond one side of the pan 27 and has at its end the sprocket 71 aligned with a sprocket 72 on the shaft 47.

A drive chain 73 connects the sprockets 71 and 72 for driving the shaft 67. The shaft 67 rotates in such a direction as to cause the slats 70 to move as indicated by the arrow 74.

As the ear of corn moves rearwardly in the pan 27, it will be caught by one of the slats 70, which will aid its rearward motion and which will effectively hold it so that when the stem comes in contact with the end of the hook 43, the rearward motion of the slats 70 will make the snapping operation of the hook more effective.

The stem will be held at either end and moved rearwardly against the hook 43.

After the ear has been snapped from its stem, the slats 70 will serve to convey it to the rear end of the pan 27.

I will now describe the conveying mechanism.

I provide two elevators, which comprise the outer frame members 75 and 76 of the first and second elevators respectively and the common frame member 77, which may be jointed together by means of the straps 78 and supported in the frame by means of the suspending brackets 79 fixed to the frame 10, and the brackets 80 fixed to the cross frames 12 and 13.

Each elevator has a false bottom 81 over which the conveyor chains travel.

In the lower end of the elevators is journaled a common shaft 82 which extends forwardly under the member 13 and is linked by means of a universal joint 83 to a forwardly and upwardly extending shaft 84.

On one of the shafts 36 is a beveled gear 85 in mesh with a beveled gear 86 on the end of the shaft 84.

At the upper end of the first elevator is a shaft 87 having thereon sprockets 88. On the shaft 82 within the first elevator are the sprockets 89 aligned with the sprockets 88, and over the sprockets 88 and 89 travel the conveyor chains 90.

The conveyor chains 90 serve to support the conveying slats 91.

At the upper end of the first elevator, a chute 92 has its upper end fixed and spaced somewhat above the conveyor chains 90. The chute 92 extends downwardly and diagonally forwardly.

Supported by the post 44 and a bracket 93 are the side members 94 of the husking mechanism journaled in brackets 95 are shafts 96 of the husking rolls 97. The shafts 96 are urged toward each other by the springs 98. At their upper ends the shafts are geared together by means of the pinions 99.

A beveled gear 100 on one of the shafts 96 is in mesh with a beveled gear 101 on the shaft 47 and serves to drive the husking rolls, so that they may rotate as indicated by the arrow 102.

The chute 92 is fixed in one of the side members 94 near the upper ends of the rolls 97.

At the upper end of the first elevator, there is fixed a curved plate 103, which has its lower end in the extended line of the upper portion of the conveyor chains 90 and which is curved upwardly and inwardly toward the chute 92.

The end of the chute 92 is spaced away from the plate 103.

As the ears of corn drop from the end of the pan 27, they will be guided by the inclined plate 104 at the lower end of the first elevator to position where they will be engaged by the conveyor slats 91.

It will be noted that since the elevator is positioned at right angles to the pan 27, that the ears of corn will be deposited in the elevator longitudinally of the same, and the elevator is of such width that the ears of corn can not assume a position crosswise thereof.

The ear of corn is conveyed upwardly until its forward nose is engaged by the lower edge of the curved plate 103, whereon the slat 91 may push the ear of corn on upwardly until it topples over, guided by the plate 103, into the chute 92.

In Figure 6, I have shown a slightly modified form of this mechanism just described in which the slats 91 are replaced by a toothed bar 91ª, the teeth of which are designed to pass through the slots 103ª of the plate 103ᵇ. This enables the plate to be extended much closer to the conveying chains.

The shaft 82 extends on through the second elevator and there serves to drive the conveying mechanism 105.

As the ears of corn slide downwardly over the husking rolls, they will be finally deposited from the ends thereof into the second elevator, whence they will be elevated into a wagon or other suitable receptacle.

Below the husking rolls 97 is a catch plate 106, which serves to carry away the husks. The plate 106 is inclined from one side to the other in order that the husks may slide down and over.

It will be noted that the various parts of my device are arranged to secure the desired results and at the same time to involve the most simple of constructions.

For instance the frames of the elevators, being arranged at right angles to the machine, may be built practically identical in construction, except for their length and width and may be made integral with each other.

Also this arrangement allows the second elevator to extend laterally of the machine in order that a wagon may be driven along beside the harvester.

The power shaft is arranged very close to the traction wheel, thus allowing a short drive chain and practically all the different operative parts of the machine are driven directly from the shaft through the medium of the gears.

Some changes may be made in the construction and arrangement of the various parts of my corn harvesting machine without departing from the essential features and purposes of my invention, and it is my intention to cover by my claims, any modified forms of structure or use of mechanical equivalents, which may be reasonably included within their scope.

I claim as my invention:

1. In a corn harvesting machine, a frame, a traction wheel, a grain wheel, divider arms, a receiving pan positioned rearwardly of said divider arms and disposed with its longitudinal axis in line with the direction of motion of the machine, a snapping hook on the side of said pan, means for guiding an ear of corn into the receiving pan in such a position that its stem will be engaged by the snapping hook, and means for engaging the ear of corn within the pan and forcing it rearwardly past the snapping hook.

2. In a corn harvesting machine, a frame, a traction wheel, a grain wheel, divider arms, a receiving pan positioned rearwardly of said divider arms and disposed with its longitudinal axis in line with the direction of motion of the machine, a snapping hook on the side of said pan, and means for guiding an ear of corn into the receiving pan in such a position that its stem will be engaged by the snapping hook.

3. In a corn harvesting machine, a frame, a traction wheel, a grain wheel, divider arms, a receiving pan positioned rearwardly of said divider arms and disposed with its longitudinal axis in line with the direction of motion of the machine, a snapping hook on the side of said pan, means for guiding an ear of corn into the receiving pan in such a position that its stem will be engaged by the snapping hook, and means for engaging the ear of corn within the pan and forcing it rearwardly past the snapping hook, said last means comprising parallel shafts mounted above the receiving pan, sprockets thereon, conveyor chains on said sprockets, and means for driving one of said shafts so as to cause the lower portions of the chains to move rearwardly.

4. In a corn harvesting machine, a frame, a traction wheel, a grain wheel, divider arms, a receiving pan positioned rearwardly of said divider arms and disposed with its longitudinal axis in line with the direction of motion of the machine, a snapping hook on the side of said pan, means for guiding an ear of corn into the receiving pan in such a position that its stem will be engaged by the snapping hook, said means including a guide post extending upwardly and forwardly from the forward end of the snapping hook, a gate mounted in the frame adjacent to the guide post, adapted to swing on an axis parallel to that of the guide post, and means for resiliently urging said gate against the corn stalk as it passes through the machine, for guiding the ear of corn to position on the other side of the post from said gate.

5. In a corn harvesting machine, a frame, a traction wheel, a grain wheel, divider arms, a receiving pan positioned rearwardly of said divider arms and disposed with its longitudinal axis in line with the direction of motion of the machine, a snapping hook on the side of said pan, means for guiding an ear of corn into the receiving pan in such a position that its stem will be engaged by the snapping hook, a first elevator positioned to receive the ears of corn from the end of the receiving pan, husking rolls, and means for delivering the corn from the end of said first elevator to said husking rolls.

6. In a corn harvesting machine, a frame, a traction wheel, a grain wheel, divider arms, a receiving pan positioned rearwardly of said divider arms and disposed with its longitudinal axis in line with the direction of motion of the machine, a snapping hook on the side of said pan, means for guiding an ear of corn into the receiving pan in such a position that its stem will be engaged by the snapping hook, a first elevator positioned to receive the ears of corn from the end of the receiving pan, husking rolls, means for delivering the corn from the end of said first elevator to said husking rolls, a second elevator positioned to receive the husked corn from the end of the husking rolls, and means for driving said husking rolls and elevators from the traction wheel, the husking rolls being so positioned above the receiving pan that the frames of the elevators may be formed integral with each other and driven by a common shaft.

7. In a corn harvesting machine, a frame, a traction wheel, a grain wheel, divider arms, a receiving pan positioned rearwardly of said divider arms, and disposed with its longitudinal axis in line with the direction of motion of the machine, a snapping hook on the side of said pan, a first elevator positioned to receive the corn ears from the end of the receiving pan, husking rolls, means for delivering the corn from the end of said first elevator to said husking rolls, a second elevator positioned to receive the husked corn from the ends of the husking rolls, and means for driving said husking rolls and elevators from the traction wheel, the husking rolls being so positioned above the receiving pan that the frames of the elevators may be formed integral with each other and driven by a common shaft.

8. In a corn harvesting machine, a frame, divider arms, a receiving pan positioned rearwardly of said divider arms and having its longitudinal axis disposed midway between the divider arms, said pan having a beveled nose extending between the rear portions of the divider arms, the pan being so supported as to leave a free passage on either side thereof between the pan and the divider arm frame members, a snapping hook on either side of the pan, means for guiding an ear of corn to position where it will be engaged by one of said snapping hooks, and means for guiding the corn stalks alternately into either passage.

9. In a corn harvesting machine, a frame, divider arms, a receiving pan positioned rearwardly of said divider arms and having its longitudinal axis disposed midway between the divider arms, said pan having a beveled nose extending between the rear portions of the divider arms, the pan being so supported as to leave a free passage on either side thereof between the pan and the divider arm frame members, a snapping hook on either side of the pan, means for guiding an ear of corn to position where it will be engaged by one of said snapping hooks, means for engaging the ear within the pan for conveying it rearwardly therein, and means for guiding the corn stalks alternately into either passage.

10. In a corn harvesting machine, a frame, divider arms, a receiving pan positioned rearwardly of said divider arms and at a height substantially midway between the ground and an ear on a standing stalk of corn, and snapping hooks on the side of said pan, said hooks having forwardly and upwardly extending portions adapted to engage an ear of corn and guide it to position within the hook.

Des Moines, Iowa, July 18, 1923.

MARTIENNS van OMMÉ.